Figure 1:
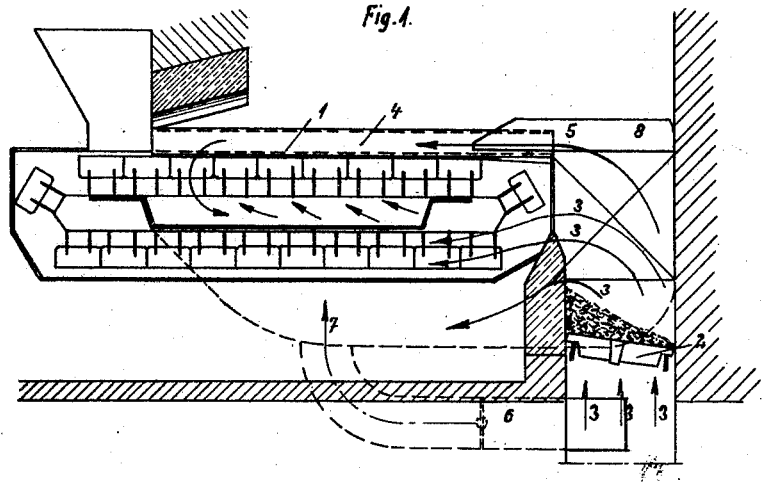

April 28, 1925.

C. CHRISTIANS 1,535,765

DEVICE FOR UTILIZING THE HEAT CONTAINED IN THE FUEL RESIDUES OF FURNACES

Filed Aug. 29, 1921

Patented Apr. 28, 1925.

1,535,765

UNITED STATES PATENT OFFICE.

CHRISTIAN CHRISTIANS, OF WILMERSDORF, NEAR BERLIN, GERMANY.

DEVICE FOR UTILIZING THE HEAT CONTAINED IN THE FUEL RESIDUES OF FURNACES.

Application filed August 29, 1921. Serial No. 496,653.

*To all whom it may concern:*

Be it known that I, CHRISTIAN CHRISTIANS, a citizen of the German Republic, and resident of Wilmersdorf, near Berlin, Germany, have invented a certain new and useful Improved Device for Utilizing the Heat Contained in the Fuel Residues of Furnaces, for which I have filed an application in Germany October 2, 1919, and of which the following is a specification.

In furnaces where travelling-grates are employed, the amount of slag produced by and resulting from the combustion of the fuel is comparatively great, especially if low-grade fuel is used, much depends also upon the size of the coal-pieces. In the case of these latter being different, the slag may contain a considerable percentage of unconsumed and still utilizable fuel, from which an adequate amount of heat might have been produced. This heat, as well as that contained in the glowing slag, has hitherto been lost. Moreover, the said residues are troublesome because the heat they radiate incommodes the attendant, the more, as the said residues give off gases which under the circumstances may be dangerous to the said attendant. Generally, the slag is cooled down by pouring water upon it. The amount of heat thus lost is particularly great also from the reason that, especially with mechanical grates, the feed of the grate depends not only upon the combustion of the fuel or its residues, but also, and, in fact, primarily upon the necessary efficiency of the furnace and the inflammability of the fuel.

The object of the present invention is to utilize the heat still contained in, and to be produced by, the residues in question, viz, the slag and the remainders of the fuel, and that object is attained by conducting the combustion-air wholly or partly first to the residues which lie upon a secondary grate and then to the fuel which lies upon the primary grate, as is more fully described hereinafter.

The glowing slag is, by this manner of operation, cooled down and the fuel-remainders contained in and accompanying it, are completely burned and consumed. The combustion-air, in passing through and over the secondary grate, takes up the heat contained in the slag and produced by the combustion of the coal pieces and carries it to the primary grate where it is appropriately utilized.

The success of this preheating of the air consists not solely in gaining the heat from the residues, but also in transferring the combustion-temperature to a higher zone, further in doing away with too great an excess of air in the furnace-space proper, and, finally, in diminishing the chimney-losses.

This manner of operation may be further improved by using the combustion-air at the same time for cooling the side-walls and side-coverings of the furnace which are exposed to danger because of the high temperature existing in the furnace-space. The combustion-air, after having been preheated, is for that purpose, led through hollow spaces provided in the said side-walls and coverings, as is also more fully described hereinafter.

Instead of leading the whole quantity of the pre-heated air through the said spaces, only a part of it need be employed for that cooling purpose.

The invention, although chiefly intended for furnaces with travelling grates, may be used also in connection with furnaces with stationary grates fed by hand.

In order to make my invention more clear, I refer to the accompanying drawings, in which Figure 1 is a vertical longitudinal section through a furnace having a travelling grate and being furnished with and operating according to my invention.

Figure 2:
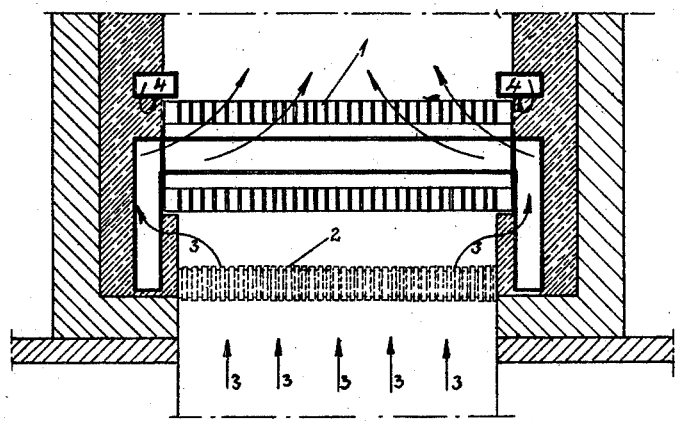

Figure 2 is a horizontal section through the front part of the said furnace.

Referring to Figures 1 and 2, the secondary grate 2 is fed from the primary grate 1, the slag being then cooled upon the grate 2 and the coal-remainders being burnt upon it. The combustion-air necessary for the whole amount of the fuel is first led to and through the grate 2 where the air, in cooling the slag, takes up the heat therein contained, as well as the heat generated by the combustion of the said coal-pieces, whereby the temperature of the air is correspondingly raised. The mixture of the air and the combustion-gases from the grate 2 thus heated then flows in the direction of the arrows 3 from the grate 2 to the grate 1 where it serves to burn the fuel lying upon this grate.

In order to compel the air to pass from the grate 2 beneath the grate 1, a horizontal wall 8 is provided which prevents the air from direct entry to the furnace above the grate 1. Said wall or plate 8 may be stationary or movable.

In the form of construction shown in Figures 1 and 2, the pre-heated air does not pass directly from the furnace grate 2 to the furnace 1, but indirectly, in that it is made to flow through spaces 4 provided in the side-walls. The arrows 5 Figure 1 indicate the direction of these air currents.

The side-walls and side-coverings are thus cooled, as already mentioned.

6 is an auxiliary channel which is provided, where only a part of the combustion-air is to be pre-heated. The other part then flows in the direction indicated by the arrow 7 through the said channel 6 directly to the primary grate 1.

Having now described my invention, what I desire to secure by a patent of the United States is:

1. In a furnace, the combination, with a travelling grate, of a secondary grate adapted to receive the residues from the said travelling grate; a conduit adapted to lead combustion-air to the said secondary grate; and a conduit adapted to lead the heated mixture of the said air and the combustion-gases from the secondary grate to the travelling grate, for the purpose as described.

2. In a furnace, the combination, with a travelling grate, of a secondary grate adapted to receive the residues from the said travelling grate; a wall arranged between the furnace space containing the said grates; a conduit adapted to lead combustion-air to the secondary grate; and a conduit adapted to lead a mixture of said air and the combustion-gases in a preheated state from the secondary grate to the travelling grate, for the purpose as described.

3. In a furnace, the combination, with a travelling grate, of a secondary grate at the end of the travelling grate and adapted to receive the residues from the said travelling grate; a conduit adapted to lead combustion-air to the secondary grate; a conduit provided in the side-walls of the furnace and being connected at one end with the furnace-space containing the secondary grate and at the other end with the furnace-space containing the travelling grate, for the purpose as described.

In testimony whereof I have hereunto set my hand in the presence of the undersigned witnesses, at Berlin, Germany, this 10th day of August, 1921.

CHRISTIAN CHRISTIANS.

Witnesses:
GEORG HIRSCHFELD,
RICHARD ANDREA.